US007430831B2

(12) United States Patent
Castellon

(10) Patent No.: US 7,430,831 B2

(45) Date of Patent: Oct. 7, 2008

(54) FIXING CLAMP FOR WINDOWS, WHICH IS INTENDED FOR MOTOR VEHICLE WINDOW REGULATORS

(76) Inventor: Melchor Daumal Castellon, Diputación, 455-457, E-08013 Barcelona (ES)

( * ) Notice: Subject to any disclaimer, the term of this patent is extended or adjusted under 35 U.S.C. 154(b) by 148 days.

(21) Appl. No.: 10/535,849

(22) PCT Filed: May 21, 2004

(86) PCT No.: PCT/ES2004/000210

§ 371 (c)(1),
(2), (4) Date: May 20, 2005

(87) PCT Pub. No.: WO2005/019578

PCT Pub. Date: Mar. 3, 2005

(65) Prior Publication Data

US 2006/0130407 A1 Jun. 22, 2006

(30) Foreign Application Priority Data

Aug. 26, 2003 (ES) ............................ 200301983 U

(51) Int. Cl.
*B60J 1/16* (2006.01)

(52) U.S. Cl. ........................................................ 49/375

(58) Field of Classification Search ................... 49/372, 49/374, 375
See application file for complete search history.

(56) References Cited

U.S. PATENT DOCUMENTS

| | | | | |
|---|---|---|---|---|
| 4,442,633 | A * | 4/1984 | Gianotti | 49/375 |
| 4,949,509 | A * | 8/1990 | Gold | 49/502 |
| 5,363,595 | A * | 11/1994 | Wirsing | 49/375 |
| 5,546,704 | A * | 8/1996 | Maruoka | 49/375 |
| 5,729,930 | A * | 3/1998 | Schust et al. | 49/375 |
| 5,907,927 | A * | 6/1999 | Lieb et al. | 49/375 |
| 5,992,099 | A * | 11/1999 | Thomas | 49/375 |
| 6,453,617 | B1 * | 9/2002 | Klippert et al. | 49/375 |

FOREIGN PATENT DOCUMENTS

| | | | |
|---|---|---|---|
| DE | 20202551 | U1 | 6/2002 |
| EP | 0208237 | A1 | 7/1986 |
| EP | 0491320 | A1 | 12/1991 |
| EP | 0 721 044 | A1 | 7/1996 |
| ES | 2136977 | T3 | 12/1999 |

* cited by examiner

*Primary Examiner*—Jerry Redman
(74) *Attorney, Agent, or Firm*—Blank Rome LLP

(57) ABSTRACT

It comprises a one-piece fastening body having a complete and/or continuous cross-section with two lateral walls spaced apart each other a distance for receiving the end of the window pane defining a U-shape the branches of which have an edge rounded inward to the body for insertion of the window pane. One of the walls has a protrusion that is fitted into a hole of the end of the window pane and it extends inwardly toward the opposed wall having a vertical groove at the free end thereof to expand it as it is fitted into the hole of the window pane. The other wall of the body has a hole formed in an area corresponding to the protrusion of the opposed wall for releasing the window from the fastening body. The body has a bottom surface for supporting the window pane made of an elastic material for taking-up vibrations and tolerances.

6 Claims, 2 Drawing Sheets

FIG. 1
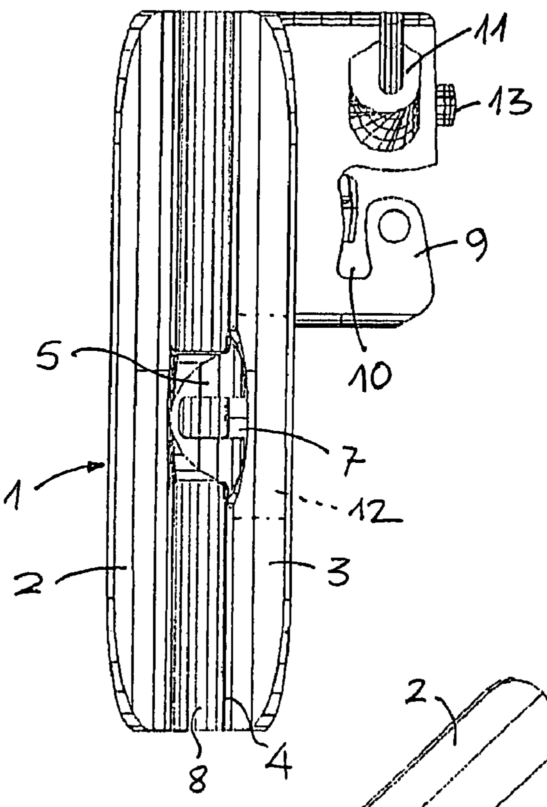
FIG. 2
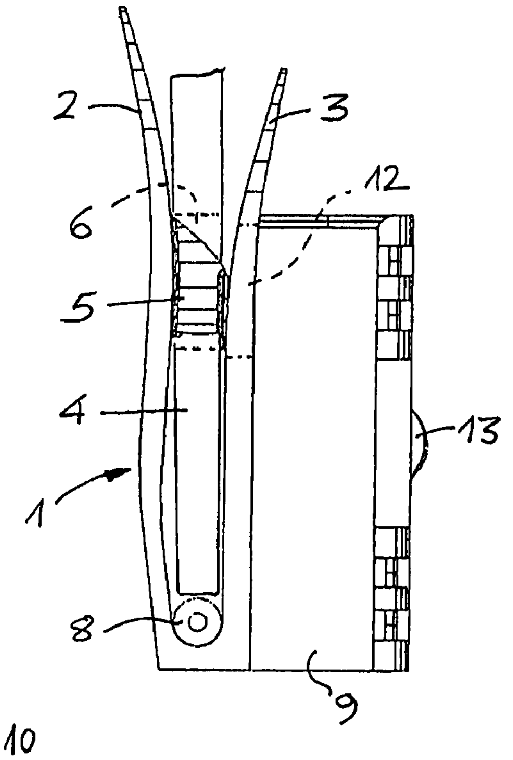
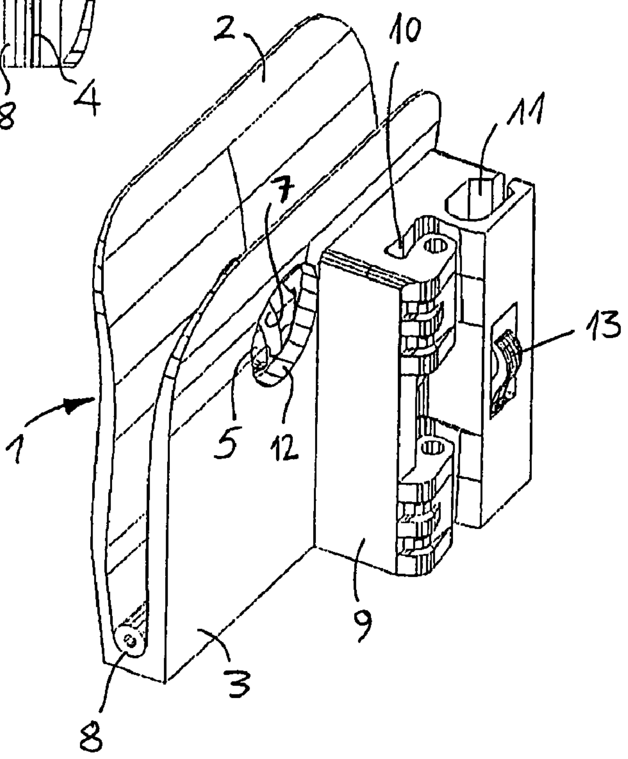
FIG. 3

FIXING CLAMP FOR WINDOWS, WHICH IS INTENDED FOR MOTOR VEHICLE WINDOW REGULATORS

FIELD OF THE INVENTION

The present invention relates, as stated in its title, to a fastening gripper for window panes in power window devices of motor vehicles, which novel manufacturing, conformation and design features fulfil the purpose to which it has been specifically conceived, with a maximum safety and effectiveness and with many advantages, as will be fully disclosed hereinafter in the present specification.

BACKGROUND OF THE INVENTION

Power window devices of motor vehicles comprise, according to the current state of the art, an electric motor (or a manually operated crank handle) that drives a pulley causing driving cables to be pulled thus making a sliding fastening device to be slid. Said sliding fastening device is moved along a guide forcing the window pane to be driven upward or downward through the corresponding guides and joints fitted in the door or frame of the vehicle door.

Fastening devices in conventional power window devices are usually formed by a body provided with a main fastening tab auxiliary fastening tabs formed in a staggered position at the upper portion thereof. Between said tabs, the lower end of the window pane is housed, which is anchored as stated below.

Said main fastening tab includes a protrusion fitted into a hole formed at the lower end of the window pane with the purpose of being coupled therein and being forced to be moved upward or downward together with the fastening device.

The hole in the window pane is usually an elongated hole and in general it is usually bigger in size than the protrusion with the purpose of speeding up the assembly of the window pane in the power window device.

There exist fastening devices for window panes in power window devices of motor vehicles having an improved configuration in which longitudinal flanges are provided, at the upper portion of the fastening device body, formed at both sides of the main fastening tab defining, between them and said body upper portion, respective housings for receiving a cylindrical elastic member (an elastomeric member made by extrusion) extending in a strip projecting outwards from each housing extending on the upper portion of each flange on which the end of the window pane rests.

Although this type of fastening device of the lower end of the window pane has been an effective solution for window pane movement, it is a solution which costs may be reduced by modifying its configuration and consequently its production process. Another of the disadvantages of the fastening devices in known power window devices is that the configuration of the tabs does not show a suitable mechanical strength during the power window device operation.

SUMMARY OF THE INVENTION

The invention provides a fastening gripper for window panes in power window devices of motor vehicles providing substantial improvements regarding the prior art fastening devices, especially in terms of resistance due to a greater rigidity of the gripper body and expenses of production due to a simpler production.

The gripper of the invention comprises a fastening body, made for example of plastic (POM), having at least a fastening tab or protrusion intended to be fitted into the hole formed at the lower end of the window pane. The gripper body of the present invention is advantageously a one-piece body. This one-piece body has two lateral walls being a complete and/or continuous surface with the purpose of providing a good flexion to strength ratio. The lateral walls are spaced apart to each other an appropriate distance for receiving said lower end of the window pane. One of said walls of the piece body is provided with said protrusion extending inward to the opposed wall, while the other wall of the fastening body has a hole formed in an area corresponding to the protrusion intended to gain access for releasing the window pane from the fastening body.

In one embodiment, the gripper is configured in such a way that the body thereof is a solid body having a U-shaped cross section. Cross-section of the surface may be varied, although the condition that said surface has to be complete and/or continuous must be met according to the invention. The branches in said U-shaped cross-section have an edge rounded inward to the body acting as a ramp to allow insertion of the window pane end in assembly operations. This U-shaped body has a bottom surface in which said branches are joined acting as a support for the lower end of the window pane. In said lower support surface there is provided a support made of an elastic material, preferably an elastomeric material (rubber, PVC, etc.) pushing the window pane up thus ensuring the fastening of the window pane, taking up vibrations and tolerances.

With a thickness smaller than the conventional fastening, a greater rigidity and high mechanical strength are obtained which remain stable during power window device operation in rising and lowering movements of the window pane. By way of an example, where the gripper plastic body in prior art fastening devices was made having a thickness larger than 2 mm, the U-shaped solid body of the gripper in the present invention may be made having a thickness ranging from 1 to 2 mm with a rigidity equal to or greater than the conventional fastening devices. In addition, there is no pull strength limitation from the POM material (failure) as well as elasticity to flexion on fastening, since, as it is a complete surface, smaller thickness may be used, maintaining a good pull strength and a better flexion.

Preferably, the gripper protrusion has, at the free end thereof, a vertical groove allowing it to be expanded as it is fitted into said hole formed at the lower end of the window pane for reducing tolerances.

BRIEF DESCRIPTION OF THE DRAWINGS

The features and the advantages of the fastening device for window panes in power window devices of motor vehicle of the present invention will be clearer from the detailed description of a preferred embodiment thereof. This description will be given hereinafter by way of a non limitative example with reference to the accompanying drawings, in which:

FIG. 1 is a top plan view of a fastening device for window panes in a power window device of motor vehicles;

FIG. 2 is an end elevation view of the device in FIG. 1;

FIG. 3 is a perspective view of the device in FIG. 1; and

Figure 4:
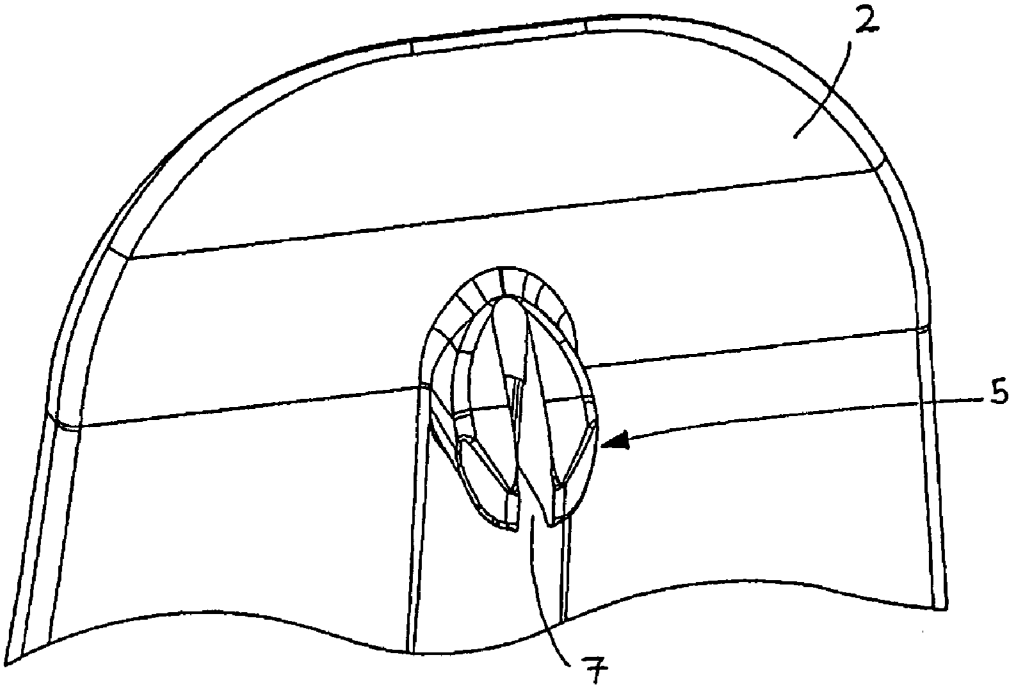
FIG. 4 is a perspective view of the device in FIG. 1 showing a protrusion on a lateral wall of the device. The elements in the figures herein attached are as follows: (1) fastening body; (2, 3) lateral walls of the fastening body; (4) window pane; (5) protrusion; (6) hole of the window pane; (7) vertical groove of the protrusion; (8) support member of elastic material; (9)

slider; (10) grooves of the slider; (11) box for terminals; (12) access hole for window pane disassembly; and (13) elastic leg.

DETAILED DESCRIPTION OF THE PREFERRED EMBODIMENT

The device that is herein described according to the enclosed figures comprises a fastening body made of, for example, plastic (POM), generally referenced by (1) in the figures. The fastening body (1) is joined to a slider (9) running along the guide rail of the power window device (not shown) through grooves (10) wherein said rail passes. The slider (9) is provided, as shown in FIG. 2, with a box for terminals (11) inside of which an elastic leg (13) is provided for avoiding noise.

The fastening body (1) is a one-piece body having a substantially U-shaped, constant cross-section, resulting in a good flexion to mechanical strength ratio.

It has two lateral walls (2, 3) slightly open outward by its upper ends to allow insertion of the lower edge of the window pane (4), as shown in FIG. 2 of the drawings attached in the present specification. For this purpose, said lateral walls (2, 3) of the fastening body (1) are spaced apart to each other an appropriate distance for receiving said lower end of the window pane (4).

The lateral wall (2) is provided with a protrusion (5) extending inwardly to the fastening body (1) which is intended to be fitted into a hole (6) formed at the lower end of the window pane (4). According to FIGS. 1 and 3 of the drawings, protrusion (5) of the device is provided with a vertical groove (7) at the free end thereof allowing it to be expanded as it is fitted into the hole (6) of the window pane (4) for reducing tolerances once it has been fitted therein. This vertical groove (7) causes the expansion of the free end or head of the protrusion (5) before it is fitted into the hole (6) of the window pane (4) of the motor vehicle. This head of the protrusion (5) is tightly fitted into said hole (6) so that it is fitted snugly therein once it is expanded in such a way that unwanted tolerances are eliminated.

The opposed lateral wall (3) has a hole (12) for gaining access in order to detach the window pane (4) by pressing the protrusion (5) of the opposed wall (2) in the fastening body (1) for disassembling it in repair and maintenance operations.

As it can be seen from figs, at the bottom of the fastening body (1) a support member is provided made of an elastic material or rubber strip (8) for supporting the window pane (4) intended to ensure fastening, and for taking-up vibrations and tolerances.

It should also be noted that the fastening device for window panes disclosed may be combined perfectly with the configuration described in the Utility Model U9802568 of the same applicant of the present application, in which the gripper or fastening body allowed a small angular play of the window pane relative to its support, with which a first rotation and a second rotation are achieved by means of a slider hinge with a support extension or bridge joining it.

The materials of the elements in the fastening device for window panes in power window devices of motor vehicles of the present invention, as well as shapes, sizes and other accessory elements may be suitably substituted with others being technically equivalents, unless departing from essentiality of the present invention or the inventive concept thereof as defined in the appended claims.

The invention claimed is:

1. Fastening gripper for a window pane in power window devices for motor vehicles comprising of:

a fastening body provided with a protrusion intended to be fitted into a window hole formed at a lower end of the window pane, wherein said fastening body is a U-shaped one-piece element having first and second lateral walls spaced apart from each other a suitable distance for receiving the window pane, and a third wall joining said first and second lateral walls, said first lateral wall having said protrusion extending inwardly to the opposed second lateral wall, and the second lateral wall having a hole aligned with said protrusion, said hole in said second lateral wall allowing access to said protrusion which allows the window pane to release from said fastening body; and a slider mounted to an outside surface of said second lateral wall adjacent said hole, said slider being configured to receive a guide rail wherein no portion of said slider obstructs said hole in said second lateral wall when the window pane is coupled to said fastening body.

2. Fastening gripper for window panes in power window devices of motor vehicles as claimed in claim 1, characterized in that said first and second lateral walls have an edge rounded outwardly to allow insertion of the end of the window pane.

3. Fastening gripper for window panes in power window devices of motor vehicles as claimed in claim 1, characterized in that said third wall has a bottom surface for supporting the window pane, the bottom surface having a support member made of an elastic material intended to push said window pane upward for fastening it, taking up vibrations and tolerances.

4. Fastening gripper for window panes in power window devices of motor vehicles as claimed in claim 1, characterized in that a vertical groove is formed at a free end of said protrusion for allowing it to be expanded as it is fitted into said hole formed at a lower end of the window pane for reducing tolerances.

5. Fastening gripper for window panes in power window devices of motor vehicles as claimed in claim 1, characterized in that said body is a variable cross-section one-piece element.

6. Fastening gripper for a window pane in power window devices for motor vehicles comprising of:

a fastening body provided with a protrusion intended to be fitted into a window hole formed at a lower end of the window pane, said protrusion having a decreasing inclined upper surface, a substantially planar lower surface, and a central groove formed at a free end thereof; and a slider mounted to said second lateral wall adjacent said hole, said slider being configured to receive a guide rail, wherein said fastening body is a one-piece element having first and second lateral walls spaced apart from each other a suitable distance for receiving the window pane, said first lateral wall having said protrusion extending inwardly to the opposed second lateral wall, and the second lateral wall having a hole aligned with said protrusion, said hole in said second lateral wall allowing access to said protrusion which allows the window pane to release from said fastening body, wherein said hole in said second lateral wall is unobstructed at an outer surface of said second lateral wall when the window pane is coupled to said fastening body.

* * * * *